(12) United States Patent
Liou (10) Patent No.: US 8,011,875 B2
(45) Date of Patent: Sep. 6, 2011

(54) CONTROLLABLE TRANSMISSION SYSTEM AND METHOD THEREOF

(75) Inventor: David Liou, Taipei County (TW)

(73) Assignee: Cheng-Tsun Liu, Taipei County (TW)

( * ) Notice: Subject to any disclaimer, the term of this patent is extended or adjusted under 35 U.S.C. 154(b) by 1051 days.

(21) Appl. No.: 11/841,681

(22) Filed: Aug. 20, 2007

(65) Prior Publication Data

US 2008/0050219 A1 Feb. 28, 2008

(30) Foreign Application Priority Data

Aug. 22, 2006 (TW) .............................. 95130867 A (51) Int. Cl.
*F03B 7/00* (2006.01)
*F03B 3/14* (2006.01)
(52) U.S. Cl. .......................................... 415/3.1; 415/26
(58) Field of Classification Search .................. 415/3.1, 415/6, 26, 47, 48, 130, 906; 416/12, 23, 416/109, 112, 113, 114, 115, 116, 138, 140, 416/141, 142, 159; 290/43, 54
See application file for complete search history.

(56) References Cited

U.S. PATENT DOCUMENTS

| | | | | |
|---|---|---|---|---|
| 382,887 A * | 5/1888 | Lefort | ........................... | 416/112 |
| 535,829 A * | 3/1895 | Holley | ........................... | 416/113 |
| 570,526 A * | 11/1896 | White | ........................... | 198/702 |
| 1,524,712 A * | 2/1925 | Hurd | ........................... | 416/140 |
| 4,717,831 A * | 1/1988 | Kikuchi | ........................... | 290/53 |
| 7,744,309 B2 * | 6/2010 | Lee et al. | ........................... | 405/75 |

* cited by examiner

*Primary Examiner* — Nathaniel Wiehe (57) ABSTRACT

A controllable transmission system and a method thereof are provided. The controllable transmission system includes a first rotation device, a coupling device and a control device. The first rotation device includes a transmission shaft, a rotation body and a plurality of blade units connected with the rotation body, wherein each of the blade units includes an adjustable blade having a first and a second contact elements and having an opening corresponding to the adjustable blade. The coupling device is mounted beside the rotation device and includes a coupling unit having a first and a second contact surfaces. The control device is connected with the coupling device for controlling a movement of the coupling device to cause one of the contact surfaces positioned corresponding to a respective one of the first contact element and the second contact element.

16 Claims, 7 Drawing Sheets

CONTROLLABLE TRANSMISSION SYSTEM AND METHOD THEREOF

FIELD OF THE INVENTION

The present invention relates to a controllable transmission system and a method thereof, and more particularly to a transmission system and a method for transmitting a motive force and enabling the receiving stress to be controllable.

BACKGROUND OF THE INVENTION

The energy is the motivity of any activity. The development of human culture relates closely with the energy used, and dependence on the energy becomes stronger with the industrialization development. Nowadays, the energy has a close relationship with economics, politics, national defense, technology, traffic and environmental sanitation, and thus it is doubtless that the energy is important. The energy used by humans can be divided into renewable energy and non-renewable energy. The renewable energy is derived from the sun, the wind, the water, the tide and the temperature difference of the ocean. However, the non-renewable energy refers to the energy with limited storage and being dwindling such as the fossil fuel (for example, the coal, the oil and the natural gas) and the nuclear energy.

The water is a commonly used energy since the ancient times. In order to make use of the water energy, the motive force generated therefrom can be outputted through a proper transmission system. Unfortunately, the existing transmission systems have a constant receiving stress rather than a controllable receiving stress, and thus they can not be controlled according to actual needs. Therefore, the water energy can not be utilized in a best way, thereby unavoidably wasting the energy.

In order to overcome the drawbacks in the prior art, a controllable transmission system with a reasonable design is provided. The present invention overcomes the drawbacks in the prior art described above, and the summary of the present invention is described as follows.

SUMMARY OF THE INVENTION

The main object of the present invention is to provide a controllable transmission system and a method thereof, which controls the received stress efficiently so as to make the received stress controllable. It is noticed that the controllable transmission system is adjustable according to actual needs and avoids the waste of energy.

In accordance with an aspect of the present invention, a controllable transmission system is provided. The controllable transmission system comprises a first rotation device, a coupling device and a control device. The first rotation device comprises a transmission shaft, a rotation body and a plurality of blade units connected with the rotation body, wherein each of the blade units comprises an adjustable blade having a first and a second contact elements and having an opening corresponding to the adjustable blade. The coupling device is mounted beside the rotation device and comprises a coupling unit having a first and a second contact surfaces. The control device is connected with the coupling device for controlling a movement of the coupling device to cause one of the contact surfaces positioned corresponding to a respective one of the first contact element and the second contact element.

According to the present invention, the blade units are arranged radially outwardly from the rotation body, wherein each the blade unit further comprises a blade support and a stationary blade fixed to the blade support, and the adjustable blade is pivotally coupled to the stationary blade through a hinge.

Preferably, the rotation device further comprises a support having two opposing bearing houses, the transmission shaft is mounted on the central part of the rotation body and passes through the two opposing bearing houses, and the rotation body is pivotally mounted on the support.

Preferably, the coupling device further comprises a base, a rotary plate mounted on the base and two coupling elements positioned between the rotary plate and the coupling device for coupling the coupling unit with the rotary plate.

Preferably, control device further comprises a stationary element, a sliding element mounted with the stationary element and having at least one first incline and at least one second incline, at least two wheels respectively running on the inclines and at least two connecting elements connected between a pivot of the at least two wheels and the rotary plate.

Preferably, the sliding element is controlled manually.
Preferably, the sliding element is controlled electrically.

In one preferred embodiment, the rotation device is connected with an output machine comprising a gear housing, a free-wheel and an output terminal, and the gear housing, the free-wheel and the output terminal are respectively connected by couplers.

Preferably, the controllable transmission system further comprises a second rotation device connected with the first rotation device by a transmission device.

Preferably, the controllable transmission system further comprises a second rotation device, wherein the first and the second rotation devices are coaxial and the second rotation device has another coupling device.

According to the present invention, the controllable transmission system is mounted on a watercourse.

In accordance with another aspect of the present invention, a controllable transmission system is provided. The controllable transmission system comprises a transmission shaft, a coupling unit having a contact surface and a control device. The transmission shaft has a plurality of blade units coupled thereto, wherein each the blade unit has an adjustable blade having a first and a second contact elements. The control device is coupled to the coupling unit for controlling the coupling unit for engaging in one of actions of positioning the contact surface corresponding to the first contact element and positioning the contact surface corresponding to the second contact element.

Preferably, the controllable transmission system further comprises a rotation device and a coupling device. The rotation device comprises a rotation body connected with the plurality of blade units. The coupling device is mounted beside the rotation device comprising the coupling unit, wherein the control device is connected with the coupling device, the blade units are arranged radially outwardly from the rotation body, each the blade unit further comprises a blade support and a stationary blade fixed to the blade support, and the adjustable blade is pivotally coupled to the stationary blade.

In accordance with a further aspect of the present invention, a controllable transmission method is provided. The controllable transmission method comprises the steps of providing a transmission shaft coupled to a plurality of blade units, providing a coupling unit having a first and a second contact surfaces, moving the coupling unit to cause one of the first and the second contact elements to be pushed by one of the first and the second contact surfaces for adjusting how the adjustable blade is disposed on the coupling unit, and modulating a transmission efficiency of a force applied on each the plurality of blade units. According to the present invention, each the blade unit has an adjustable blade having a first contact element and a second contact element.

Preferably, each the blade units further comprises a stationary blade, and the adjustable blade is pivotally coupled to the stationary blade.

Preferably, the controllable transmission method further comprises a step of providing a controllable transmission system comprising a first rotation device, a coupling device and a control device. The first rotation device comprises the transmission shaft, a rotation body and the plurality of blade units connected with the rotation body, wherein each of the blade units has an opening corresponding thereto. The coupling device is mounted beside the rotation device and comprises the coupling unit having a first and a second contact surfaces. The control device is connected with the coupling device for controlling a movement of the controlling device to cause one of situations that the first contact surface is positioned corresponding to the first contact element and that the second contact surface is positioned corresponding to the second contact element, wherein each the blade unit receives a minimum stress when the adjustable blade is not covering the opening, and receives a maximum stress when the opening is covered by the adjustable blade.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Preferred Embodiment

Figure 1:
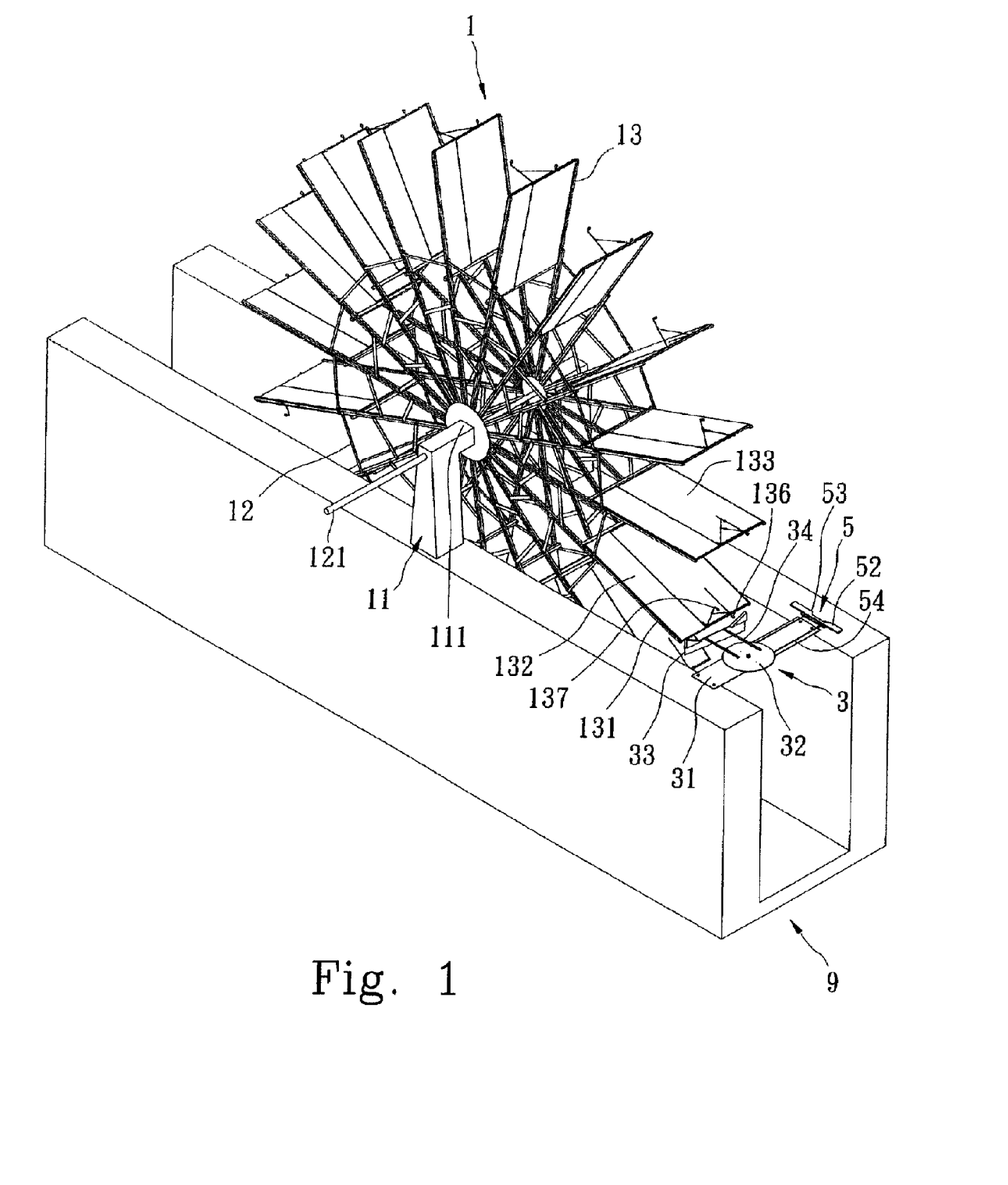
FIG. 1 is a 3-D diagram of the controllable transmission system in the present invention.
Figure 2:
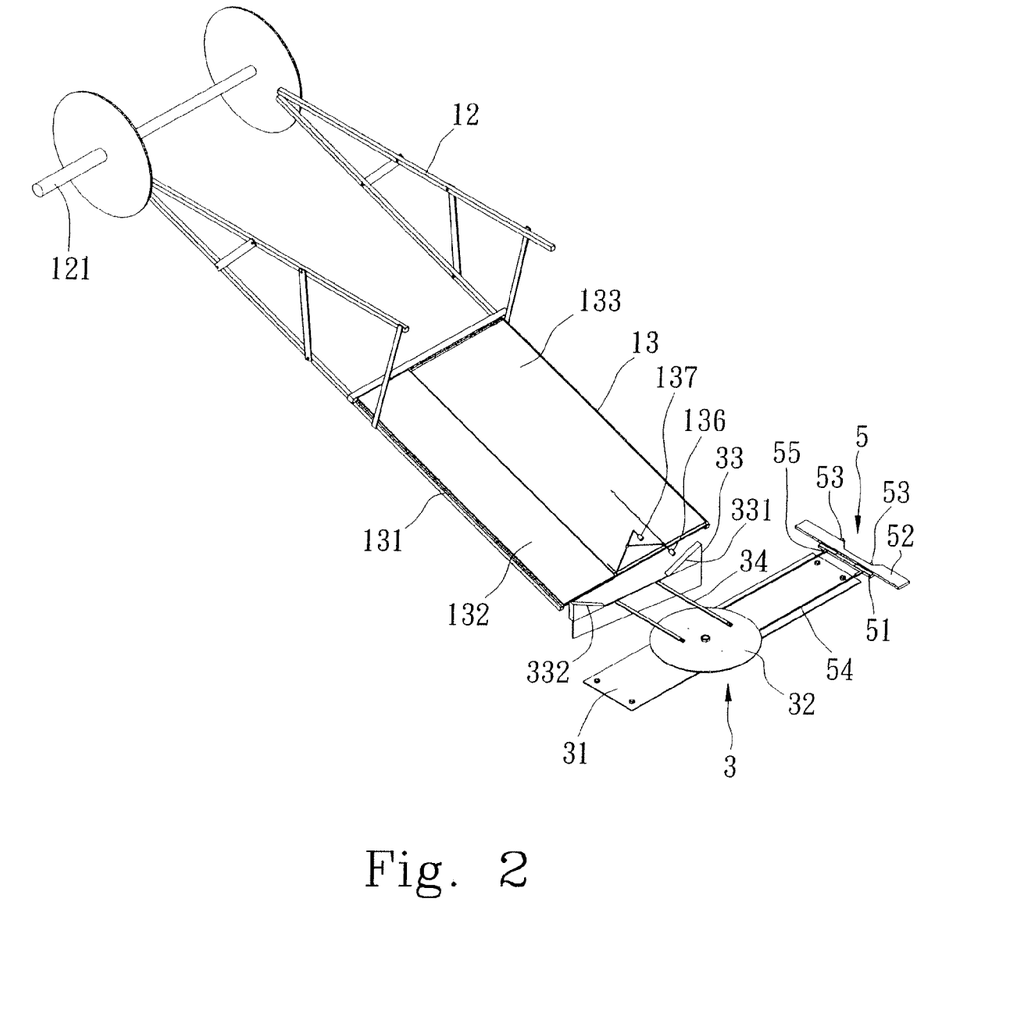
FIG. 2 is a 3-D diagram of a single blade unit coupled with the coupling device and the control device in the present invention.
Figure 3:
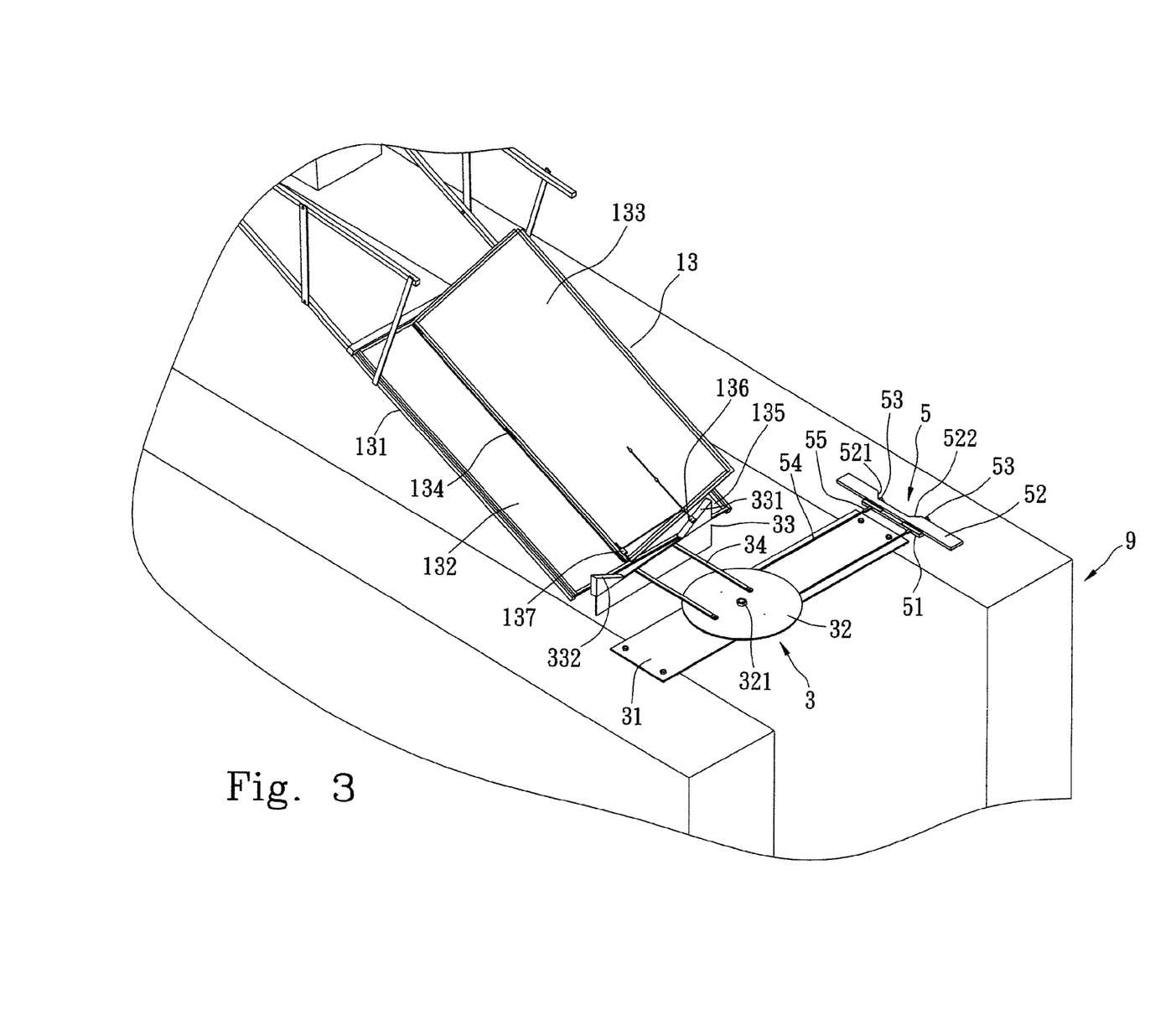
FIG. 3 is a 3-D diagram showing a process of opening the adjustable blade of the blade unit in the present invention.

Please refer to FIG. 1 to FIG. 3. The present invention is a controllable transmission system, which is mounted on a watercourse or other appropriate positions with a constant flow rate. The controllable transmission system comprises a rotation device 1, a coupling device 3 and a control device 5, wherein the rotation device comprises a support 11, a rotation body 12 and a plurality of blade units 13, where the support 11 is a fixed skeleton having two opposing bearing houses 111. The rotation body 12 has a transmission shaft 121 mounted on the central part thereof, wherein the transmission shaft 121 passes through the two opposing bearing houses 111 to mount the rotation body 12 on the support 11. Alternately, a chain wheel 78 can be disposed on the transmission shaft 121 to parallel a plurality of rotation devices 1 by using the chain wheel 78 and a chain 79, and thus the output motive force is increased. Further, if the plurality of rotation devices are coaxial and each rotation device 1 has a coupling device 3, the controllable transmission system can also provide an increased motive force.

The blade units 13 are arranged radially outwardly from the rotation body 12 with an interval. The number of the blade units 13 is not limited and can be increased or decreased according to actual situations. Each blade unit 13 comprises a blade support 131, a stationary blade 132 and an adjustable blade 133. The blade support 131 is formed by extending the outer side of the rotation body 12, and the stationary blade 132 is fixed to the blade support 131. The adjustable blade 133 is pivotally coupled to the stationary blade 132 at one side through a hinge being responsible for opening and closing of the adjustable blade 133. Accordingly, an opening 135 corresponding to the adjustable blade 133 is formed on the blade unit 13, wherein the movement of the opening 135 is controlled by the adjustable blade 133.

The outer side of the adjustable blade 133 of each blade unit 13 is further connected to a first contact element 136 and a second contact element 137, wherein the first contact element 136 and the second contact element 137 protrude outside the blade unit 13 at different positions. When the first contact element is pushed, the adjustable blade 133 is moved and opened, whereas the second contact element 137 is pushed, the adjustable blade 133 is moved and closed. The rotation device 1 is mounted on a watercourse 9, and the lower half of the rotation body 12 and the blade units 13 thereof are immersed in the water, so that the blade units 13 are moved by the water, thereby rotating the rotation device 1.

The coupling device 3 is mounted beside the rotation device, which comprises a base 31 mounted across a watercourse 9, a rotary plate 32, a coupling unit 33 and two coupling elements 34. The center of the rotary plate 32 is pivoted on the top of the base 31 through a shaft 321 so that the rotary plate 32 can rotate on the base 31. The coupling unit 33 is positioned between the rotary plate 32 and the rotation device 1, which is movably mounted beside the rotation device 1. Further, the coupling unit 33 has a first contact surface 331 and a second contact surface 332 positioned with an interval, and the coupling unit 33 is coupled with the rotary plate 32 through the two coupling elements 34.

The control device 5 is positioned beside the coupling device 3 and comprises a stationary element 51, a sliding element 52, at least two wheels 53 and at least two connecting element 54, wherein the stationary 51 is fixed apart from the coupling device 3 on one side. The sliding element 52 mounted on the stationary element 51 has a first incline 521 and a second incline 522. The sliding element 52 can be controlled manually or electrically through connecting with a transmission machine or a motor for a forward and backward movement.

The two wheels 53 having a respective pivot 55 run on the first incline 521 and the second incline 522 respectively. The pivot 55 mounted on the stationary element 51 slides perpendicularly to the sliding of the sliding element 52 to move forward and backward to the rotary plate 32. The two connecting elements 54 connected between the pivot 55 of the two wheels 53 and the rotary plate 32 enable the control device 5 to be connected with the rotation device 1 through the coupling device 3. When the two wheels 53 run on the first incline 521 and the second incline 522, the rotary plate 32 can be driven by the movement of the pivot 55 and the connecting elements 54. According to the above-mentioned components, a controllable transmission system of the present invention is formed.

Figure 4:
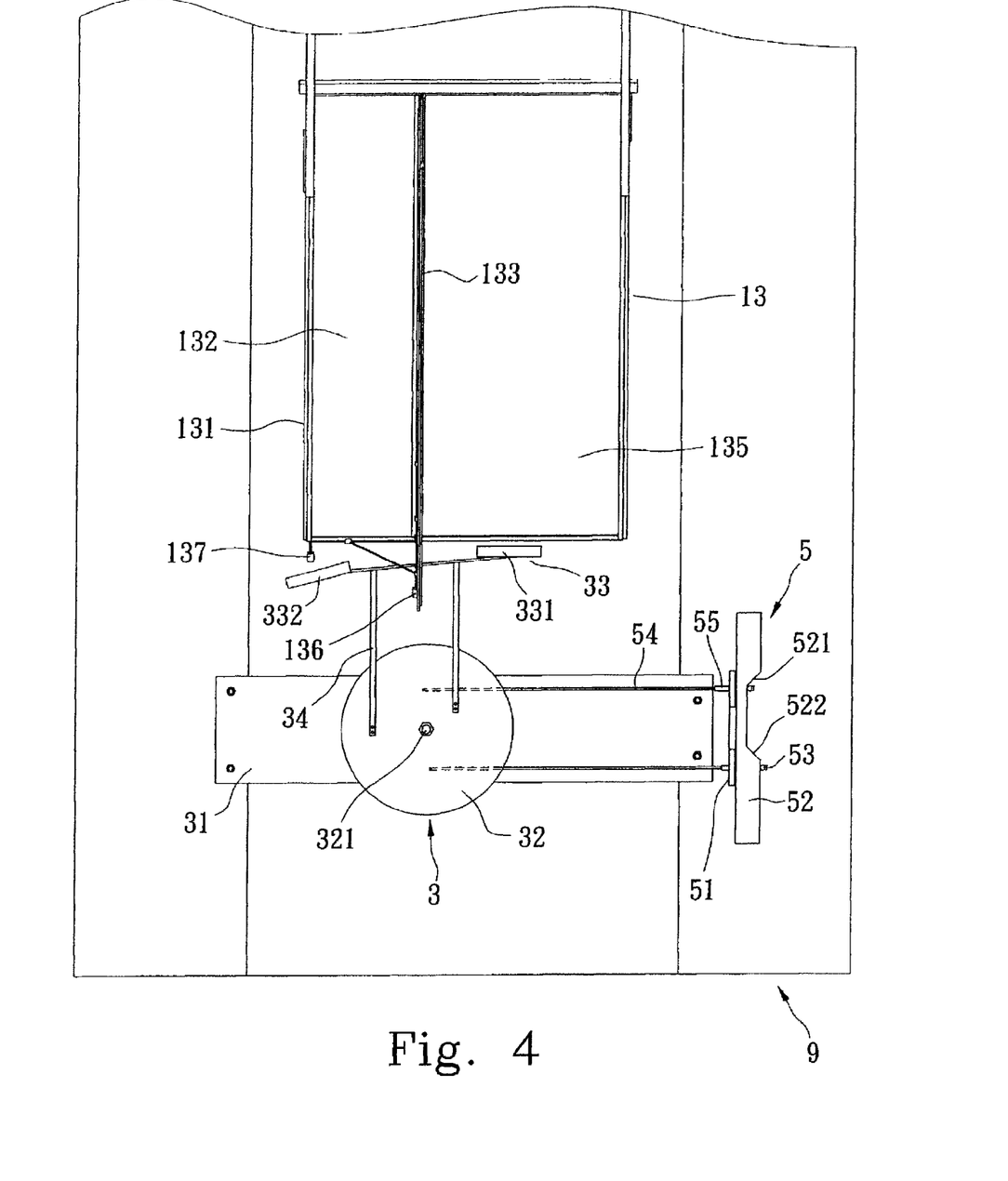
FIG. 4 is a top view of the open adjustable blade of the blade unit in the present invention.
Figure 5:
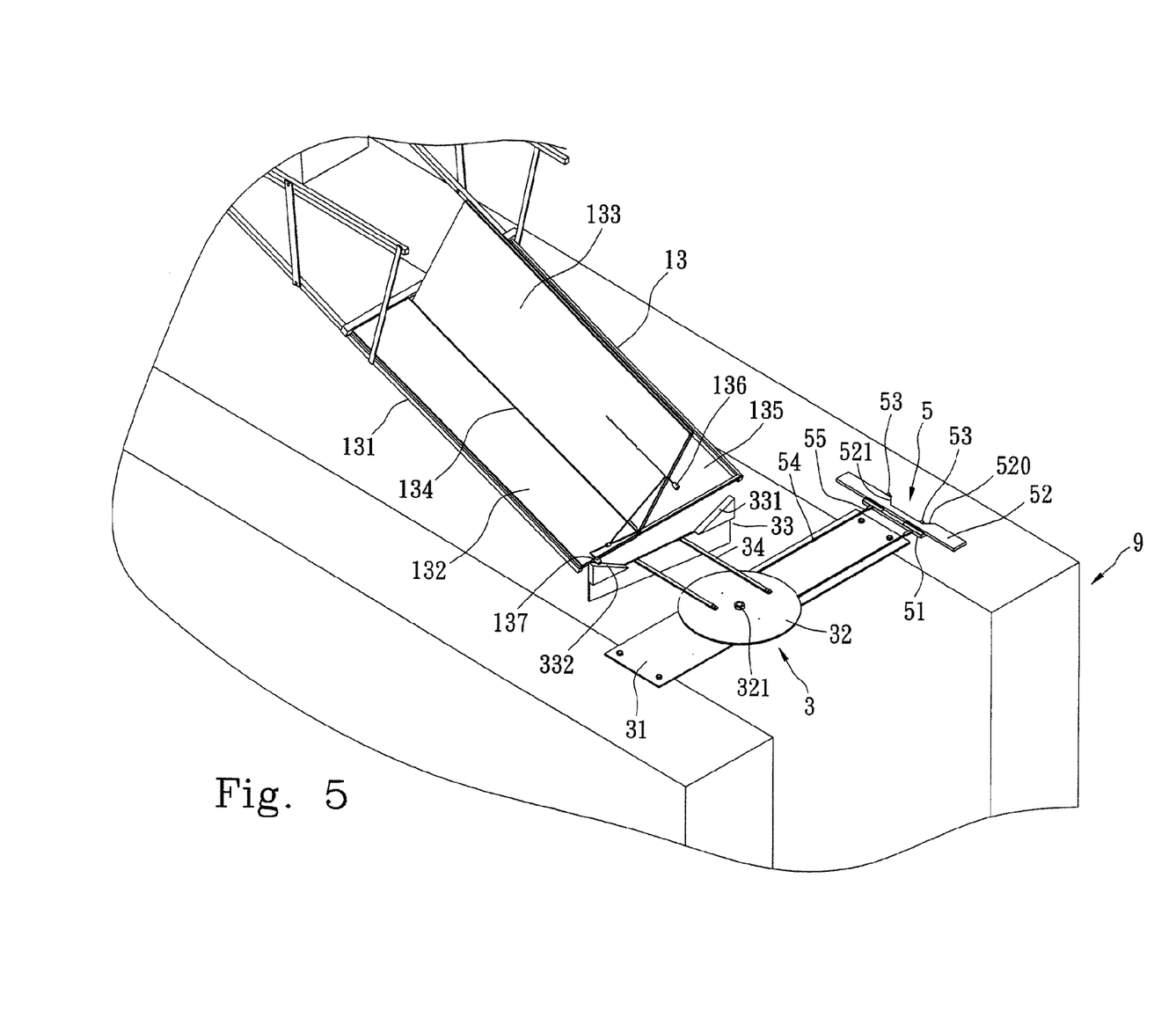
FIG. 5 is a 3-D diagram showing a process of closing the adjustable blade of the blade unit in the present invention.
Figure 6:
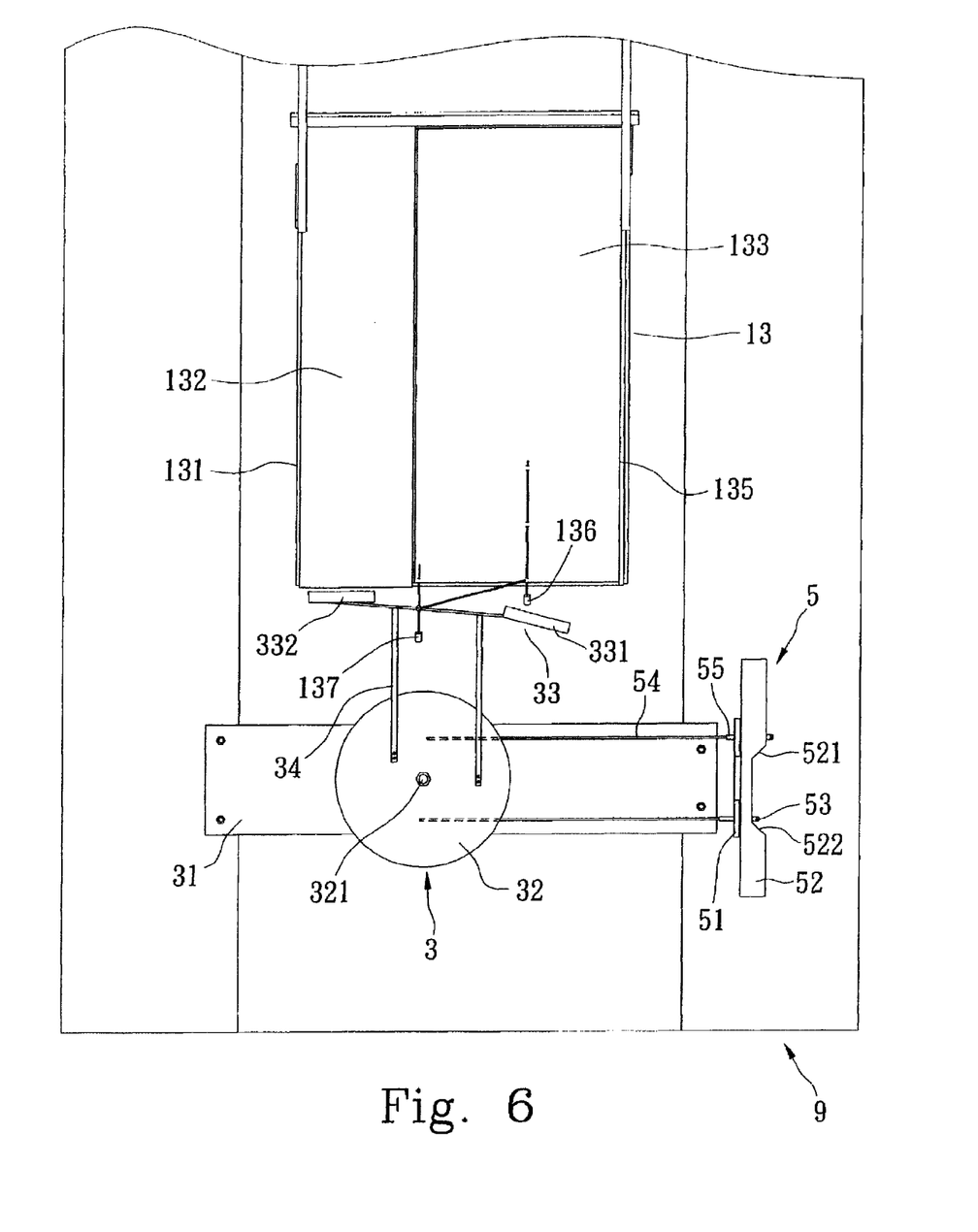
FIG. 6 is a top view of the closed adjustable blade of the blade unit in the present invention.

In another aspect, the present invention provides a controllable transmission method, which comprises the following steps (please refer to FIG. 1 to FIG. 6):

a. A transmission system comprising a rotation device 1, a coupling device 3 and a control device 5 is provided, wherein the rotation device 1 comprises a rotation body 12 and a plurality of the blade units 13 connected with rotation body 12, and each of the blade units 13 comprises an adjustable blade 133 having a first contact element 136 and a second contact element 137 and having an opening 135 corresponding to the adjustable blade 133. The coupling device 3 mounted beside the rotation device 1 comprises a rotary plate 32 and a coupling unit 33, wherein the coupling unit 33 having a first contact surface 331 and a second contact surface 332 is positioned beside the rotation device 1. The control device 5 comprises a sliding element 52, at least two wheels 53 and at least two connecting elements 54, wherein the sliding element 52 having a first incline 521 and a second incline 522 runs on a stationary element 51, and the two wheels 53 pivoted on a pivot 55 respectively run on the first incline 521 and the second incline 522, and the pivot 55 is positioned slidably on the stationary element 51 and connected with the rotary plate 32 by the two connecting elements 54.

b. The pivot 55 and the two connecting elements 54 are driven by pushing the wheels 53 with the inclines 521 and 522 of the sliding element 52 of the control device 5 for rotating the rotary plate 32 of the coupling device 3.

c. The coupling unit 33 is moved by the rotary plate 32 to enable the first contact surface 331 or the second contact surface 332 to be positioned corresponding to the first contact element 136 (as FIG. 3 shows) or the second contact element 137 (as FIG. 5 shows).

d. The plurality of the blade units 13 are moved by the water for rotating the rotation device 1 clockwise. If the first contact surface 331 of the coupling unit 33 is corresponding to the first contact element 136, the first contact element 136 can be pushed by the first contact surface 331 which causes the adjustable blade 133 to be open (as FIG. 3 and FIG. 4 show). However, if the second contact surface 332 of the coupling unit 33 is corresponding to the second contact element 137, the second contact element 137 can be pushed by the second contact surface 332 which causes the adjustable blade 133 to be closed (as FIG. 5 and FIG. 6 show).

When the above-mentioned adjustable blade 133 is not covering the opening 135, the blade units 13 receive a minimum stress, and when the adjustable blade 133 is covering the opening 135, the blade units 13 receive a maximum stress. Therefore, the contact area of the blade units 13 is changeable.

Figure 7:
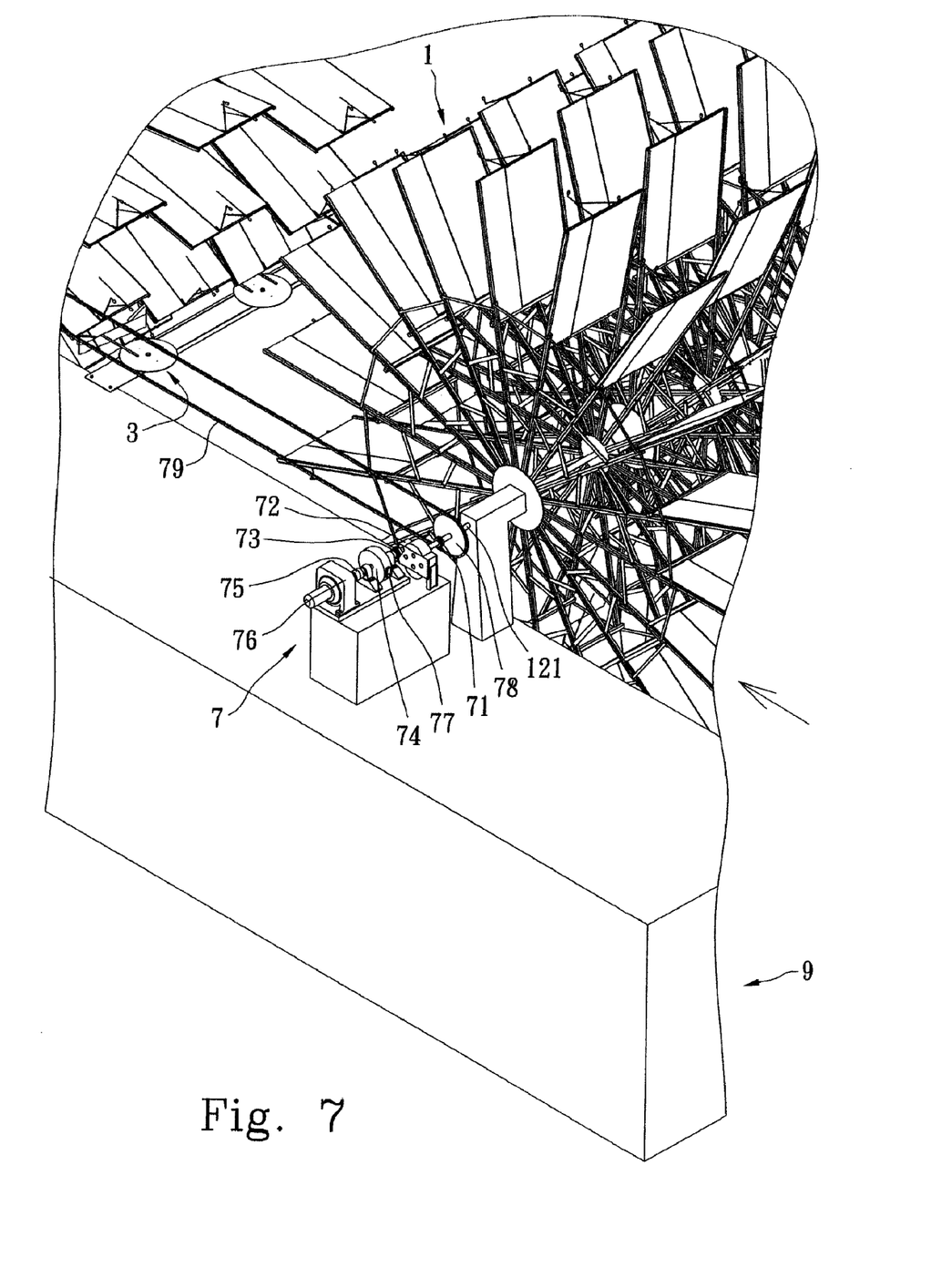
FIG. 7 is a 3-D diagram of the controllable transmission system connected with an output machine in the present invention.

Please refer to FIG. 7, which is a 3-D diagram of the controllable transmission system in the present invention that is connected with an output machine. The motive force generated by the rotation device 1 can be outputted through an output machine 7 connected to the transmission shaft 121, wherein the output machine 7 comprises a first coupler 71, a gear housing 72, a second coupler 73, a free-wheel 74, a third coupler 75 and an output terminal 76. The first coupler 71 connects the transmission shaft 121 and the gear housing 72, the second coupler 73 connects the gear housing 72 and the free-wheel 74, and the third coupler 75 connects the free-wheel 74 and the output terminal 76. The free-wheel 74 stabilizes the output of the motive force and further comprises a brake 77 for controlling the output and the stop of the motive force. The type of the output terminal 76 is not limited, it can be any power-driving device such as a generator.

Based on the above embodiments, it is known that the distinguishing feature of the present invention lies in the controllable blade units 13 of the rotation device 1. The adjustable blade 133 of the blade units 13 can be adjusted as an open or a closed state by the control device 5 through the coupling device 3 so as to modulate the contact area of the blade units 13 and control the stress received by the blade units 13. Accordingly, the stress received by the rotation device 1 is controllable based on actual needs so that a maximum efficiency of the controllable transmission system is obtained and the waste of the energy is avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A controllable transmission system, comprising:
   a first rotation device, comprising:
      a transmission shaft;
      a rotation body; and
      a plurality of blade units connected with the rotation body, wherein each of the blade units comprises an adjustable blade having a first and a second contact elements and having an opening corresponding to the adjustable blade;
   a coupling device mounted beside the rotation device and comprising a coupling unit having a first and a second contact surfaces;
   a control device connected with the coupling device for controlling a movement of the coupling device to cause one of the contact surfaces positioned corresponding to a respective one of the first contact element and the second contact element.

2. The controllable transmission system as claimed in claim 1, wherein the blade units are arranged radially outwardly from the rotation body, wherein each the blade unit further comprises a blade support and a stationary blade fixed to the blade support, and the adjustable blade is pivotally coupled to the stationary blade through a hinge.

3. The controllable transmission system as claimed in claim 1, wherein the rotation device further comprises a support having two opposing bearing houses, the transmission shaft is mounted on the central part of the rotation body and passes through the two opposing bearing houses, and the rotation body is pivotally mounted on the support.

4. The controllable transmission system as claimed in claim 1, wherein the coupling device further comprises a base, a rotary plate mounted on the base and two coupling elements positioned between the rotary plate and the coupling device for coupling the coupling unit with the rotary plate.

5. The controllable transmission system as claimed in claim 4, wherein the control device further comprises a stationary element, a sliding element mounted with the stationary element and having at least one first incline and at least one second incline, at least two wheels respectively running on the inclines and at least two connecting elements connected between a pivot of the at least two wheels and the rotary plate.

6. The controllable transmission system as claimed in claim 5, wherein the sliding element is controlled manually.

7. The controllable transmission system as claimed in claim 5, wherein the sliding element is controlled electrically.

8. The controllable transmission system as claimed in claim 1, wherein the rotation device is connected with an output machine comprising a gear housing, a free-wheel and an output terminal, and the gear housing, the free-wheel and the output terminal are respectively connected by couplers.

9. The controllable transmission system as claimed in claim 1, further comprising a second rotation device connected with the first rotation device by a transmission device.

10. The controllable transmission system as claimed in claim 1, further comprising a second rotation device, wherein the first and the second rotation devices are coaxial and the second rotation device has another coupling device.

11. The controllable transmission system as claimed in claim 1, being mounted on a watercourse.

12. A controllable transmission system, comprising:
a transmission shaft and a plurality of blade units coupled to the transmission shaft, wherein each the blade unit has an adjustable blade having a first and a second contact elements;
a coupling unit having a contact surface; and
a control device coupled to the coupling unit for controlling the coupling unit for engaging in one of actions of positioning the contact surface corresponding to the first contact element and positioning the contact surface corresponding to the second contact element.

13. A controllable transmission system according to claim 12, further comprising:
a rotation device comprising a rotation body connected with the plurality of blade units; and
a coupling device mounted beside the rotation device comprising the coupling unit, wherein the control device is connected with the coupling device, the blade units are arranged radially outwardly from the rotation body, each the blade unit further comprises a blade support and a stationary blade fixed to the blade support, and the adjustable blade is pivotally coupled to the stationary blade.

14. A controllable transmission method, comprising the steps of:
providing a transmission shaft coupled to a plurality of blade units, wherein each the blade unit has an adjustable blade having a first contact element and a second contact element;
providing a coupling unit having a first and a second contact surfaces;
moving the coupling unit to cause one of the first and the second contact elements to be pushed by one of the first and the second contact surfaces to adjust the adjustable blade; and
modulating a transmission efficiency of a force applied on each the plurality of blade units.

15. The controllable transmission method as claimed in claim 14, wherein each the blade units further comprises a stationary blade, and the adjustable blade is pivotally coupled to the stationary blade.

16. A controllable transmission method, comprising the step of providing a controllable transmission system comprising:
a first rotation device, comprising:
the transmission shaft;
a rotation body; and
the plurality of blade units connected with the rotation body, wherein each of the blade units has an opening corresponding thereto;
a coupling device mounted beside the rotation device and comprising the coupling unit having a first and a second contact surfaces; and
a control device connected with the coupling device for controlling a movement of the coupling device to cause one of situations that the first contact surface is positioned corresponding to the first contact element and that the second contact surface is positioned corresponding to the second contact element, wherein each the blade unit receives a minimum stress when the adjustable blade is not covering the opening, and receives a maximum stress when the opening is covered by the adjustable blade.

* * * * *